US012579597B2

(12) United States Patent (10) Patent No.: US 12,579,597 B2
Ikeguchi (45) Date of Patent: Mar. 17, 2026

(54) POINT GROUP DATA SYNTHESIS APPARATUS, NON-TRANSITORY COMPUTER-READABLE MEDIUM HAVING RECORDED THEREON POINT GROUP DATA SYNTHESIS PROGRAM, POINT GROUP DATA SYNTHESIS METHOD, AND POINT GROUP DATA SYNTHESIS SYSTEM

(71) Applicant: DAIHEN Corporation, Osaka (JP)

(72) Inventor: Makoto Ikeguchi, Osaka (JP)

(73) Assignee: DAIHEN Corporation, Osaka (JP)

( * ) Notice: Subject to any disclaimer, the term of this patent is extended or adjusted under 35 U.S.C. 154(b) by 599 days.

(21) Appl. No.: 18/084,283

(22) Filed: Dec. 19, 2022

(65) Prior Publication Data

US 2024/0029189 A1     Jan. 25, 2024

(30) Foreign Application Priority Data

Jul. 20, 2022     (JP) ................................. 2022-115172

(51) Int. Cl.
G06T 1/00          (2006.01)
B25J 11/00         (2006.01)
G06T 7/73          (2017.01)

(52) U.S. Cl.
CPC ........... G06T 1/0014 (2013.01); B25J 11/005 (2013.01); G06T 7/73 (2017.01)

(58) Field of Classification Search
CPC .... G06T 7/73; G06T 7/70; G06T 7/74; G06T 2207/20221; G06T 2207/10028; G06T 2207/30244
See application file for complete search history.

(56) References Cited

U.S. PATENT DOCUMENTS 9,270,974 B2 *    2/2016  Zhang ................... H04N 13/207
10,796,403 B2 *  10/2020  Choi ..................... G06V 40/166
                (Continued)

FOREIGN PATENT DOCUMENTS

CN        112270709 A  *  1/2021  ............. G06F 18/23
CN        114120355 A  *  3/2022
                (Continued)

OTHER PUBLICATIONS

I. Tsuchida, F. Chen, J. Izawa and K. Kotani, "High Quality Free Viewpoint Synthesis Using Multi-view Images with Depth Information," 2011 IEEE International Symposium on Multimedia, Dana Point, CA, USA, 2011, pp. 13-18, doi: 10.1109/ISM.2011.12. (Year: 2011).*

(Continued)

*Primary Examiner* — Michael Robert Cammarata
(74) *Attorney, Agent, or Firm* — Sterne, Kessler, Goldstein & Fox P.L.L.C.

(57) ABSTRACT

A point group data synthesis apparatus includes: an image acquisition unit that acquires a plurality of images including a working target; a point group acquisition unit that acquires, for each of the images, point group data on a camera coordinate system with reference to a camera that photographs the images; a detection unit that detects each position on the camera coordinate system of a visual characteristic point commonly included in the respective images; a user coordinate system setting unit that sets a user coordinate system with reference to the position on the camera coordinate system of the characteristic point detected for each of the images; a coordinate conversion unit that converts, for each of the images, the point group data on the camera coordinate system into point group data on the user coordinate system; and a point group synthesis unit that synthe- (Continued)

sizes the point group data on the user coordinate system converted for each of the images together.

5 Claims, 6 Drawing Sheets

(56) References Cited

U.S. PATENT DOCUMENTS

| 2016/0314593 | A1* | 10/2016 | Metzler | G06T 7/73 |
| 2019/0279399 | A1* | 9/2019 | Yasunaga | G06T 7/80 |
| 2021/0209750 | A1* | 7/2021 | Aponte | G06T 7/0012 |
| 2021/0243369 | A1* | 8/2021 | Dal Mutto | G06T 7/80 |
| 2022/0262039 | A1* | 8/2022 | Jin | G06T 7/80 |
| 2023/0055649 | A1* | 2/2023 | Huang | G06T 7/33 |

FOREIGN PATENT DOCUMENTS

| CN | 113450254 | B | * | 6/2022 | G06T 7/33 |
| JP | 2016070708 | A | | 5/2016 | |
| JP | 2017-106749 | | | 6/2017 | |
| KR | 20190082068 | A | * | 7/2019 | G06T 7/248 |
| KR | 10-2206108 | B1 | | 1/2021 | |

OTHER PUBLICATIONS

Shin Minhwan et al: "3D LiDAR-based point cloud map registration: Using spatial location of visual features", 2017 2nd International Conference on Robotics and Automation Engineering (ICRAE), IEEE, Dec. 29, 2017, pp. 373-378, XP033320842.

Gabrielle Flood et al: "Generic Merging of Structure from Motion Maps with a Low Memory Footprint", 2020 25th International Conference on Pattern Recognition (ICPR), IEEE, Jan. 10, 2021, pp. 4385-4392, XP033908856.

* cited by examiner

1

POINT GROUP DATA SYNTHESIS APPARATUS, NON-TRANSITORY COMPUTER-READABLE MEDIUM HAVING RECORDED THEREON POINT GROUP DATA SYNTHESIS PROGRAM, POINT GROUP DATA SYNTHESIS METHOD, AND POINT GROUP DATA SYNTHESIS SYSTEM

BACKGROUND

Field

The present invention relates to a point group data synthesis apparatus, a non-transitory computer-readable medium having recorded thereon a point group data synthesis program, a point group data synthesis method, and a point group data synthesis system.

Description of Related Art

When a robot operation is taught using three-dimensional point group data measured by a laser scanner or the like, there are many cases where the acquisition of sufficient data is not possible by only with one measurement in one direction. Accordingly, measurement is performed in a plurality of directions to obtain necessary data. In this case, it is requested that respective data obtained by performing measurement in a plurality of directions be synthesized together with high accuracy.

Patent Publication JP-A-2016-70708 discloses a method in which, when two point group data pieces are superimposed one upon another, three or more characteristic points are extracted from both point group data pieces and the characteristic points are superimposed one upon another to synthesize the whole point group data together.

SUMMARY

However, since point group data generally has low accuracy or low resolution, the accuracy of synthesized point group data also becomes low in Patent Publication JP-A-2016-70708.

Therefore, the present invention has an object of providing a point group data synthesis apparatus, a non-transitory computer readable medium having recorded thereon a point group data synthesis program, a point group data synthesis method, and a point group data synthesis system that are able to increase accuracy in synthesizing a plurality of point group data pieces together.

A point group data synthesis apparatus according to an aspect of the present invention includes: an image acquisition unit that acquires a plurality of images including a working target; a point group acquisition unit that acquires, for each of the images, point group data on a camera coordinate system with reference to a camera that photographs the images; a detection unit that detects each position on the camera coordinate system of a visual characteristic point commonly included in the respective images; a user coordinate system setting unit that sets a user coordinate system with reference to the position on the camera coordinate system of the characteristic point detected for each of the images by the detection unit; a coordinate conversion unit that converts, for each of the images, the point group data on the camera coordinate system into point group data on the user coordinate system; and a point group synthesis unit that synthesizes the point group data on the user coordinate system converted for each of the images by the coordinate conversion unit together.

According to the aspect, the point group data synthesis apparatus is allowed to: acquire a plurality of images including a working target; acquire point group data on a camera coordinate system for each of the images; detect respective positions on the camera coordinate system of a visual characteristic point commonly included in the respective images; set a user coordinate system with reference to the detected position on the camera coordinate system of the characteristic point; convert the point group data on the camera coordinate system into point group data on the user coordinate system for each of the images; and synthesize the converted point group data on the user coordinate system together. Thus, it is possible to synthesize point group data on the camera coordinate system together after converting the same into point group data on the user coordinate system with reference to a characteristic point commonly included in a plurality of images generally having higher resolution than that of the point group data.

In the above aspect, when detecting the characteristic point on a basis of each of the images, the detection unit may set the detected position of the characteristic point as the position of the characteristic point on the image and the point group data.

According to the aspect, it is possible to set the positions of a characteristic point detected on the basis of images as common positions on the images and point group data.

In the above aspect, when not allowed to detect the characteristic point on a basis of each of the images, the detection unit may cause the visual characteristic point on the image to be specified to detect the visual characteristic point and set the detected position of the characteristic point as the position of the characteristic point on the image and the point group data.

According to the aspect, when not allowed to detect a characteristic point through, for example, the analysis or the like of an image, it is possible to easily detect the characteristic point by causing an operator to specify the characteristic point on the image or the like and set the detected position of the characteristic point as a common position on the image and point group data.

A point group data synthesis program recorded on a computer-readable medium according to another aspect of the present invention causes a computer to function as: an image acquisition unit that acquires a plurality of images including a working target; a point group acquisition unit that acquires, for each of the images, point group data on a camera coordinate system with reference to a camera that photographs the images; a detection unit that detects each position on the camera coordinate system of a visual characteristic point commonly included in the respective images; a user coordinate system setting unit that sets a user coordinate system with reference to the position on the camera coordinate system of the characteristic point detected for each of the images by the detection unit; a coordinate conversion unit that converts, for each of the images, the point group data on the camera coordinate system into point group data on the user coordinate system; and a point group synthesis unit that synthesizes the point group data on the user coordinate system converted for each of the images by the coordinate conversion unit together.

According to the aspect, the point group data synthesis program is allowed to: acquire a plurality of images including a working target; acquire point group data on a camera coordinate system for each of the images; detect respective positions on the camera coordinate system of a visual characteristic point commonly included in the respective images; set a user coordinate system with reference to the detected position on the camera coordinate system of the characteristic point; convert the point group data on the camera coordinate system into point group data on the user coordinate system for each of the images; and synthesize the converted point group data on the user coordinate system together. Thus, it is possible to synthesize point group data on the camera coordinate system together after converting the same into point group data on the user coordinate system with reference to a characteristic point commonly included in a plurality of images generally having higher resolution than that of the point group data.

A point group data synthesis method according to another aspect of the present invention is performed by a processor, the method including the steps of: acquiring, for each of the images, a plurality of images including a working target; acquiring point group data on a camera coordinate system with reference to a camera that photographs the images; detecting each position on the camera coordinate system of a visual characteristic point commonly included in the respective images; setting a user coordinate system with reference to the position on the camera coordinate system of the characteristic point detected for each of the images; converting, for each of the images, the point group data on the camera coordinate system into point group data on the user coordinate system; and synthesizing the point group data on the user coordinate system converted for each of the images together.

According to the aspect, the point group data synthesis method is allowed to: acquire a plurality of images including a working target; acquire point group data on a camera coordinate system for each of the images; detect respective positions on the camera coordinate system of a visual characteristic point commonly included in the respective images; set a user coordinate system with reference to the detected position on the camera coordinate system of the characteristic point; convert the point group data on the camera coordinate system into point group data on the user coordinate system for each of the images; and synthesize the converted point group data on the user coordinate system together. Thus, it is possible to synthesize point group data on the camera coordinate system together after converting the same into point group data on the user coordinate system based on a characteristic point commonly included in a plurality of images generally having higher resolution than that of the point group data.

A point group data synthesis system according to another aspect of the present invention includes: a photographing apparatus that includes an image sensor that photographs a plurality of images including a working target and a distance measurement sensor that measures a distance to the working target; an image acquisition unit that acquires the images from the image sensor; a point group acquisition unit that acquires, for each of the images, point group data on a camera coordinate system with reference to the photographing apparatus from the distance measurement sensor; a detection unit that detects each position on the camera coordinate system of a visual characteristic point commonly included in the respective images; a user coordinate system setting unit that sets a user coordinate system with reference to the position on the camera coordinate system of the characteristic point detected for each of the images by the detection unit; a coordinate conversion unit that converts, for each of the images, the point group data on the camera coordinate system into point group data on the user coordinate system; and a point group synthesis unit that synthesizes the point group data on the user coordinate system converted for each of the images by the coordinate conversion unit together.

According to the aspect, the point group data synthesis system is allowed to: acquire a plurality of images including a working target; acquire point group data on a camera coordinate system for each of the images; detect respective positions on the camera coordinate system of a visual characteristic point commonly included in the respective images; set a user coordinate system with reference to the detected position on the camera coordinate system of the characteristic point; convert the point group data on the camera coordinate system into point group data on the user coordinate system for each of the images; and synthesize the converted point group data on the user coordinate system together. Thus, it is possible to synthesize point group data on the camera coordinate system together after converting the same into point group data on the user coordinate system with reference to a characteristic point commonly included in a plurality of images generally having higher resolution than that of the point group data.

According to the present invention, it is possible to provide a point group data synthesis apparatus, a non-transitory computer readable medium having recorded thereon a point group data synthesis program, a point group data synthesis method, and a point group data synthesis system that are able to increase accuracy in synthesizing a plurality of point group data together.

DETAILED DESCRIPTION

A preferred embodiment of the present invention will be described with reference to the accompanying drawings. Note that components denoted by the same symbols in respective figures have the same or similar configurations. Further, the drawings are schematically shown, and therefore respective constituting elements are different from actual ones in dimension and ratio.

Figure 1:
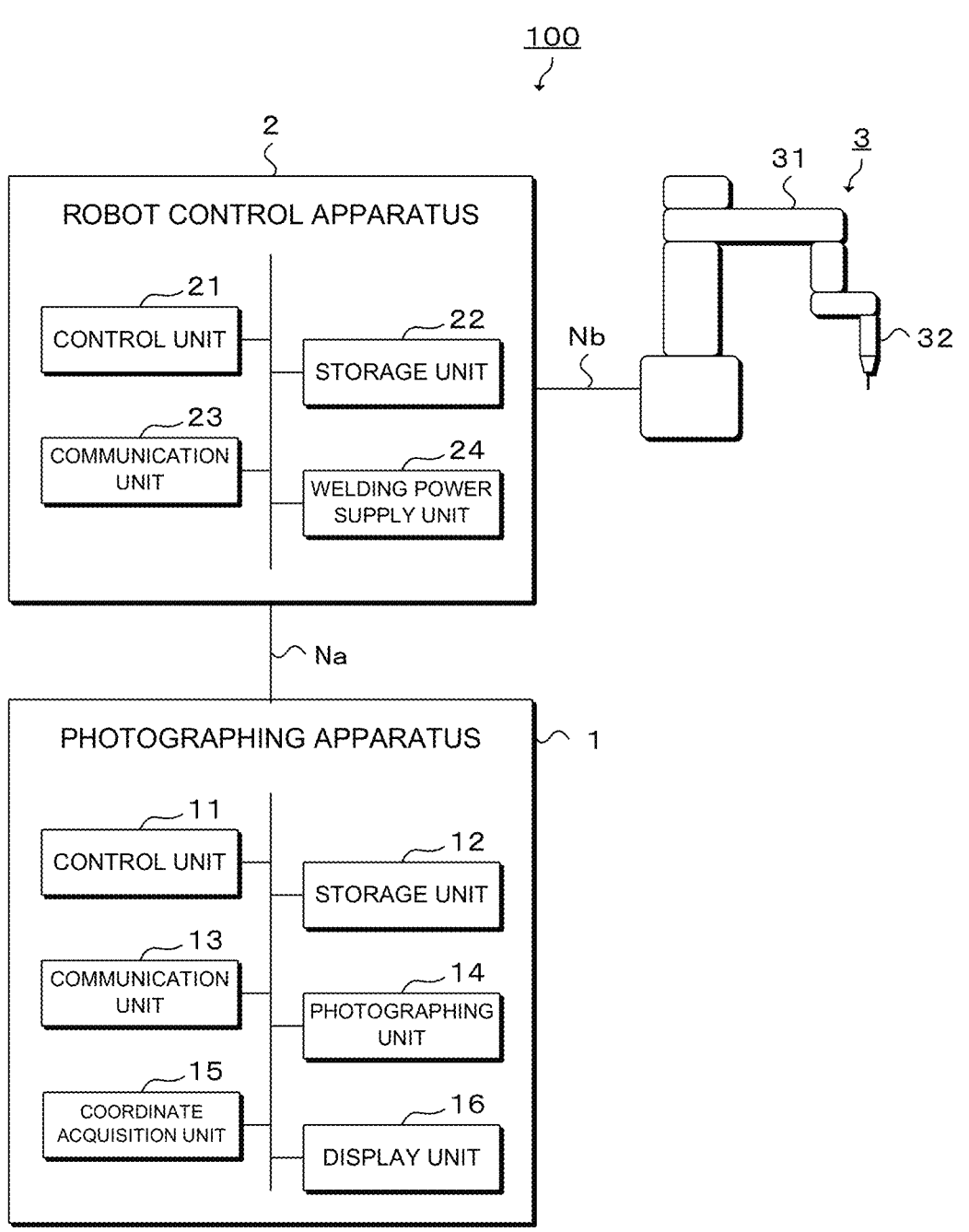
FIG. 1 is a diagram illustrating the configuration of a welding robot system including a photographing apparatus in which a point group data synthesis program according to an embodiment is installed.

FIG. 1 is a diagram illustrating the configuration of a welding robot system 100 including a photographing apparatus (point group data synthesis apparatus) 1 in which a point group data synthesis program according to the embodiment is installed. The welding robot system 100 includes, for example, a photographing apparatus 1, a robot control apparatus 2, and a manipulator 3. The photographing apparatus 1 and the robot control apparatus 2 are connected to each other via, for example, a network Na, and the robot control apparatus 2 and the manipulator 3 are connected to each other via, for example, a communication cable Nb. The network Na may be a wireless network or a wired network (including a communication cable). Note that the welding robot system 100 may include a teaching pendant. The teaching pendant is an operating apparatus used by an operator to teach the operation of the manipulator 3 and becomes available when connected to the robot control apparatus 2.

The manipulator 3 is a welding robot that performs arc welding according to construction conditions set in the robot control apparatus 2. The manipulator 3 has, for example, an articulated arm 31 provided on a base member fixed to a floor or the like of a factory and a welding torch 32 connected to the tip end of the articulated arm 31. Instead of the welding torch 32, a tool or the like may be coupled to the tip end of the articulated arm 31.

The robot control apparatus 2 is a control unit that controls the operation of the manipulator 3 and includes, for example, a control unit 21, a storage unit 22, a communication unit 23, and a welding power supply unit 24.

The control unit 21 is, for example, a processor and runs a working program stored in the storage unit 22 as a processor to control the manipulator 3 and the welding power supply unit 24.

The communication unit 23 controls communication with the photographing apparatus 1 connected via the network Na or communication with the manipulator 3 connected via the communication cable Nb.

The welding power supply unit 24 supplies, in order to, for example, generate an arc between the tip end of a welding wire and a workpiece, a welding current, a welding voltage, or the like to the manipulator 3 according to previously-set welding construction conditions. The welding construction conditions include, for example, data items such as a welding condition, a welding start position, a welding end position, a welding distance, and the attitude of a welding torch. The welding condition includes, for example, data items such as a welding current, a welding voltage, a welding speed, a wire feeding speed, and a workpiece thickness. The welding power supply unit 24 may be provided separately from the robot control apparatus 2.

As the photographing apparatus 1, a tablet terminal with a digital camera is, for example, available. However, the photographing apparatus 1 is not limited to this but may be a portable terminal with a digital camera. The portable terminal includes, for example, a transportable terminal such as an AR device, a smart phone, a mobile information terminal (PDA), and a notebook PC (personal computer).

The photographing apparatus 1 includes, for example, a control unit 11, a storage unit 12, a communication unit 13, a photographing unit 14, a coordinate acquisition unit 15, and a display unit 16.

The control unit 11 is, for example, a processor and runs a program such as a point group data synthesis program stored in the storage unit 12 as a processor to control the respective units of the photographing apparatus 1.

The storage unit 12 stores various programs and various data. The various programs include, for example, a point group data synthesis program or the like according to the embodiment. The various data includes, for example, marker information on a marker, point group data information on point group data that will be described later. Note that the marker information or the point group data information may be stored in the storage unit 22 of the robot control apparatus 2.

Figure 2:
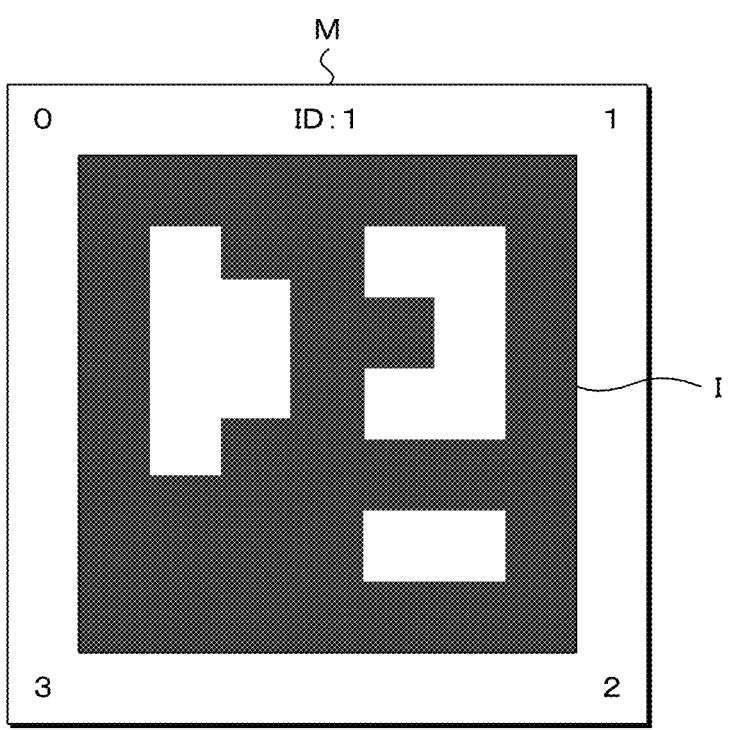
FIG. 2 is a diagram showing an example of a marker.

The marker information may include, for example, a marker ID and an identification image for specifying a marker, shape information on the shape of a marker (for example, a square or a rectangle), size information on the size of a marker (for example, the lengths of respective sides or the angles of respective apexes of a quadrangle), color design information on the design or color of a marker, information on the characteristic point of a marker, or the like. As the characteristic point of a marker, a plurality of corners of the marker or the center of the marker may be set. FIG. 2 shows an example of a marker.

Near the upper center of a marker M shown in FIG. 2, "1" is assigned as a marker ID (marker identifier) for specifying a marker. Near four corners of the marker M, numbers "0" to "3" are assigned as corner numbers (corner identifiers) for specifying corner positions. Further, inside the peripheral edge part of the marker M, an identification image I that is different in design or shape depending on a marker is assigned.

Note that the marker is not limited to the marker shown in FIG. 2 but any marker is available so long as it is recognizable by the photographing apparatus 1. An AR marker is preferably used as a marker. With the use of the AR marker, it is possible to easily realize a superimposed display of a marker coordinate system with reference to the AR marker on an actual image when the AR marker is recognized. Further, the marker identifier is not limited to a marker ID but may be, for example, a number, an image, a shape, or their combinations. Moreover, the corner identifiers are not limited to corner numbers but may be, for example, symbols, colors, shapes, or their combinations.

The communication unit 13 shown in FIG. 1 controls communication with the robot control apparatus 2 connected via the network Na.

The photographing unit 14 is, for example, a digital camera including a lens and an image sensor (imaging element) and converts the light of a subject received by the lens into an electric signal (image data). The digital camera may be any of a two-dimensional camera and a three-dimensional camera.

The coordinate acquisition unit 15 is, for example, a distance measurement sensor and acquires three-dimensional coordinate data (hereinafter also called "point group data") corresponding to a target. As the distance measurement sensor, a LiDAR (Light Detection and Ranging) sensor, a millimeter wave sensor, an ultrasonic wave sensor, or the like may be, for example, used. Note that three-dimensional coordinate data corresponding to a target may be calculated and acquired on the basis of a plurality of images obtained by photographing a subject at a plurality of different positions.

With the image sensor (photographing unit 14) and the distance measurement sensor (coordinate acquisition unit 15) provided in the photographing apparatus 1, it is possible to perform adjustment so that a three-dimensional camera coordinate system with reference to the digital camera (for example, the center of a lens) and the coordinate system of point group data acquired by the distance measurement sensor are matched to each other and maintain the matched state. Further, with the image sensor and the distance measurement sensor provided in the photographing apparatus 1, it is possible for an operator who operates the photographing apparatus 1 to freely move to an arbitrary position at which simultaneous photographing of a welding target and a marker is allowed and perform photographing. Therefore, an increase in working efficiency is allowed.

Note that the distance measurement sensor may be provided separately from the photographing apparatus 1. However, in this case, every time the positional relationship between the distance measurement sensor and the photographing apparatus 1 changes, it is preferable to perform the adjustment operation of matching the camera coordinate system with reference to the digital camera and the coordinate system of the point group data acquired by the distance measurement sensor to each other.

The display unit 16 is, for example, a display with a touch panel and receives an input such as operation instructions by an operator while displaying an image of a subject by the photographing unit 14. The display unit 16 may be provided separately from the photographing apparatus 1 as, for example, a display apparatus having a touch panel.

Figure 3:
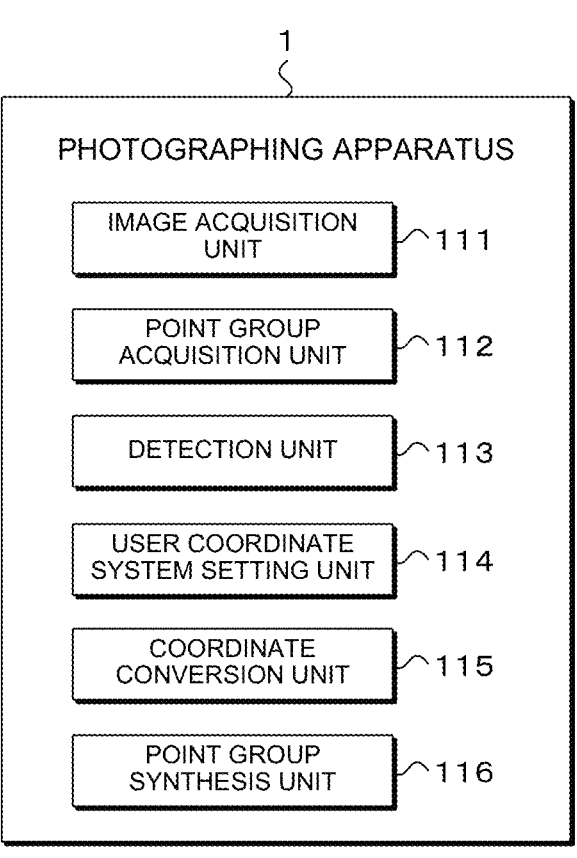
FIG. 3 is a diagram illustrating the functional configuration of the photographing apparatus.

FIG. 3 is a diagram illustrating the functional configuration of the photographing apparatus 1 according to the present invention. The photographing apparatus 1 has, for example, an image acquisition unit 111, a point group acquisition unit 112, a detection unit 113, a user coordinate system setting unit 114, a coordinate conversion unit 115, and a point group synthesis unit 116 as the functional configuration. The respective units will be sequentially described below.

The image acquisition unit 111 acquires an image photographed by a digital camera. In the present embodiment, the image acquisition unit 111 acquires images obtained by photographing a welding target at a plurality of different positions. The acquired plurality of images may be individually-photographed still images or a plurality of images cut out (extracted) from a moving image under a prescribed condition. As the prescribed condition, a condition under which it is possible to determine whether the photographing apparatus 1 has moved to a different position such as the condition that a certain time elapses, the condition that an image changes at a certain ratio or more, and the condition that a value detected by a gyro sensor or the like changes by a certain amount or more is preferably used. Thus, it is possible to acquire point group data measured at a plurality of different positions.

The point group acquisition unit 112 acquires point group data corresponding to a subject photographed by the digital camera from the distance measurement sensor. The acquired point group data is drawn on a camera coordinate system with reference to the digital camera.

The detection unit 113 detects the characteristic point of a reference marker photographed together with a welding target in each of images and acquires a position on the camera coordinate system of the detected characteristic point. The detection unit 113 sets the positions of the detected characteristic points as the positions of the characteristic points of the reference marker on the images and point group data. The reference marker is a marker registered in marker information among markers. For example, the reference marker may be arranged on the periphery of the welding target or on the welding target.

In detecting the characteristic point of the reference marker, the detection unit 113 analyzes the images on the basis of, for example, the shape, size, design, color, or the like of the marker included in the marker information, recognizes the reference marker included in the images, and detects the characteristic point (for example, the corner, center, or the like of the marker) of the recognized reference marker.

Figure 4C:
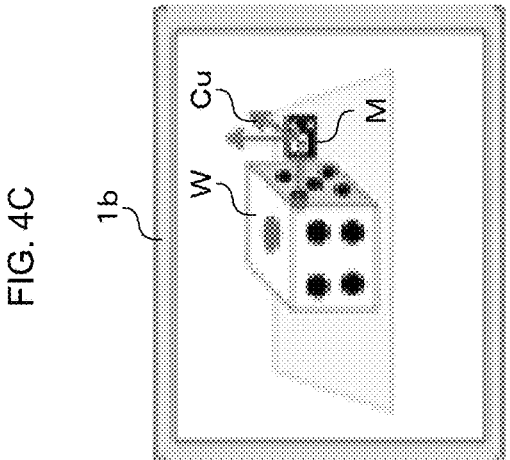
FIGS. 4A to 4C are image diagrams in a case in which the characteristic point of a reference marker is detected from each of a plurality of images.
Figure 4B:
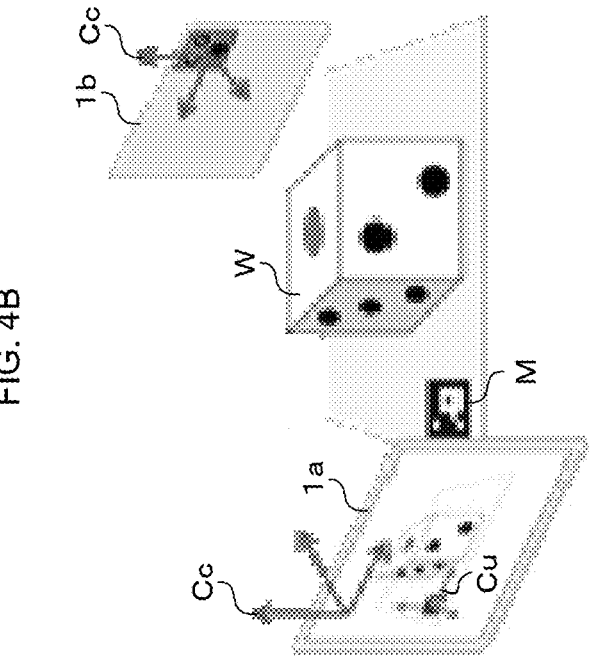
Figure 4A:
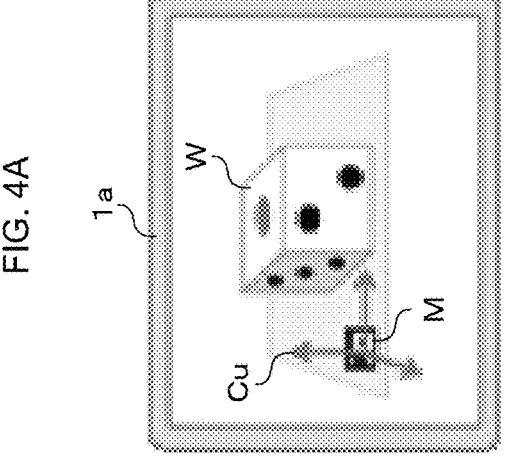

Here, FIGS. 4A to 4C show image diagrams in a case in which the characteristic point of a reference marker is detected from each of a plurality of images. FIG. 4B is a diagram schematically showing a state in which each of photographing apparatuses 1a and 1b at two different positions photographs a welding target W and a reference marker M. FIG. 4A is a diagram of the display of the photographing apparatus 1a of FIG. 4B when seen from its front side. FIG. 4C is a diagram of the display of the photographing apparatus 1b of FIG. 4B when seen from its front side.

In the displays of the photographing apparatuses 1a and 1b shown in FIGS. 4A to 4C, the welding target W and the reference marker M are displayed on a camera coordinate system Cc. In FIGS. 4A to 4C, the detection unit 113 detects the center of the marker as the characteristic point of the reference marker M and acquires a position on the camera coordinate system Cc corresponding to the center of the detected marker.

Note that a target detected by the detection unit 113 is not limited to the characteristic point of a marker but may only be a visual characteristic point which is included in a photographed image and of which the position is fixed. The visual characteristic point may be one that serves as a marker on a welding target. For example, when it is assumed that a dice is a welding target, a red-circle portion showing a first spot of the dice may be a visual characteristic point.

Further, when not allowed to detect a visual characteristic point through the analysis or the like of an image, the detection unit 113 may detect the visual characteristic point by, for example, causing an operator to specify the visual characteristic point on an image acquired by the image acquisition unit 111 or the like. In this case, the detection unit 113 sets, through the comparison between the image and point group data, the position of the detected visual characteristic point on the above image as the position of the visual characteristic point on the image and the point group data. Thus, it is possible to make the position of a characteristic point on an image having high resolution and the position of a characteristic point on point group data having low resolution correspond to each other on a camera coordinate system.

Figures 5A, 5B, 5C:
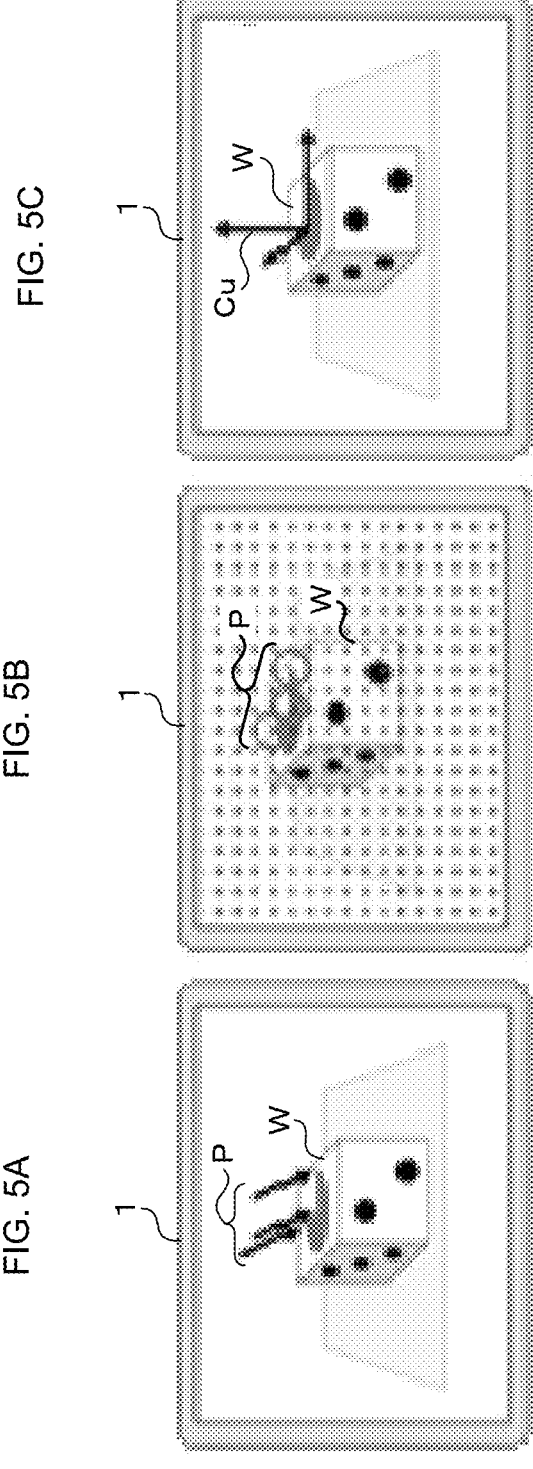
FIGS. 5A to 5C are image diagrams in a case in which a red-circle portion showing a first spot of a dice is detected as a visual characteristic point.

Here, FIGS. 5A to 5C show image diagrams in a case in which a red-circle portion showing a first spot of a dice is detected as a visual characteristic point. FIG. 5A is a schematic diagram illustrating that a cut line provided at a red-circle portion showing a first spot of a dice that is a welding target W is detected as a candidate P for a visual characteristic point. FIG. 5B is a schematic diagram illustrating that point group data is displayed on the image of FIG. 5A so as to be superimposed and a position on a camera coordinate system corresponding to the candidate P for the visual characteristic point on the image is acquired. FIG. 5C is a schematic diagram illustrating that a visual characteristic point is detected from the image of FIG. 5A.

The user coordinate system setting unit 114 shown in FIG. 3 sets a user coordinate system based on a characteristic point detected by the detection unit 113. The user coordinate system is set for each of photographed images. Illustratively, FIGS. 4A and 4C show a user coordinate system (marker coordinate system) Cu with reference to the characteristic point of the reference marker M on the respective images, and FIG. 5C shows a user coordinate system Cu with reference to the visual characteristic point of the welding target W.

The setting of a user coordinate system with reference to a characteristic point is allowed by the movement of the origin (for example, the center of a lens) of a camera coordinate system to the characteristic point. Such a user coordinate system is settable by the application of, for example, a known technology to set the coordinate system of an AR marker.

Here, point group data generally has lower resolution and lower data accuracy than those of an image, and therefore its deviation degree from the position of an actual object or its error degree is larger than that of an image. Accordingly, by setting a user coordinate system with reference to a characteristic point detected on an image having high resolution, it is possible to set an accurate coordinate system accurately reflecting the position of a characteristic point compared with a case in which a user coordinate system is set with reference to a characteristic point detected on point group data having low resolution.

The coordinate conversion unit 115 shown in FIG. 3 converts, for each of photographed images, the point group data of a camera coordinate system into the point group data of a user coordinate system. A conversion formula for converting the coordinate system of point group data is calculatable as follows on the basis of, for example, the corner positions of a reference marker in each of a camera coordinate system and a user coordinate system.

First, each of a camera coordinate system A and a user coordinate system B is defined as in the following Formula (1) on the basis of the respective coordinates of corner numbers "0," "1," and "2" of a reference marker. Here, the coordinates of the camera coordinate system of the corner number "0" are represented as $(x_0, y_0, z_0)$, and the coordinates of the user coordinate system thereof are represented as $(x'_0, y'_0, z'_0)$. The coordinates of the camera coordinate system of the corner number "1" are represented as $(x_1, y_1, z_1)$, and the coordinates of the user coordinate system thereof are represented as $(x'_1, y'_1, z'_1)$. The coordinates of the camera coordinate system of the corner number "2" are represented as $(x_2, y_2, z_2)$, and the coordinates of the user coordinate system thereof are represented as $(x'_2, y'_2, z'_2)$.

[Math. 1]

$$A = \begin{bmatrix} x_0 & x_1 & x_2 \\ y_0 & y_1 & y_2 \\ z_0 & z_1 & z_2 \end{bmatrix}, B = \begin{bmatrix} x'_0 & x'_1 & x'_2 \\ y'_0 & y'_1 & y'_2 \\ z'_0 & z'_1 & z'_2 \end{bmatrix} \quad (1)$$

Using the camera coordinate system A and the user coordinate system B in the above Formula (1), the transformation matrix (A0, B0, Mt) of the camera coordinate system and the user coordinate system is calculated. Coordinates A0, coordinates B0, a rotation matrix Mt constituting the transformation matrix are defined as in the following Formula (2).

[Math. 2]

$$A0 = \begin{bmatrix} x_1 \\ y_1 \\ z_1 \end{bmatrix}, B0 = \begin{bmatrix} x1' \\ y'_1 \\ z'_1 \end{bmatrix}, Mt = V_B \cdot V_A^{-1} \quad (2)$$

$V_A$ in the above Formula (2) is calculated as in the following Formula (3).

[Math. 3]

$$V_A = \begin{bmatrix} \dfrac{vecA_0}{|vecA_0|} & \dfrac{vecA_1}{|vecA_1|} & \dfrac{vecA_2}{|vecA_2|} \end{bmatrix} \quad (3)$$

Each of $vecA_0$, $vecA_1$, and $vecA_2$ in the above Formula (3) is calculated as in the following Formula (4).

[Math. 4]

$$vecA_0 = \begin{bmatrix} x_0 - x_1 \\ y_0 - y_1 \\ z_0 - z_1 \end{bmatrix}, vecA_1 = \begin{bmatrix} x_2 - x_1 \\ y_2 - y_1 \\ z_2 - z_1 \end{bmatrix}, vecA_2 = vecA_0 \times vecA_1 \quad (4)$$

$V_B$ in the above Formula (2) is calculated as in the following Formula (5).

[Math. 5]

$$V_A = \begin{bmatrix} \dfrac{vecB_0}{|vecB_0|} & \dfrac{vecB_1}{|vecB_1|} & \dfrac{vecB_2}{|vecB_2|} \end{bmatrix} \quad (5)$$

Each of $vecB_0$, $vecB_1$, and $vecB_2$ in the above Formula (5) is calculated as in the following Formula (6).

[Math. 6]

$$vecA_0 = \begin{bmatrix} x'_0 - x'_1 \\ y'_0 - y'_1 \\ z'_0 - z'_1 \end{bmatrix}, vecB_1 = \begin{bmatrix} x'_2 - x'_1 \\ y'_2 - y'_1 \\ z'_2 - z'_1 \end{bmatrix}, vecB_2 = vecB_0 \times vecA_1 \quad (6)$$

On the basis of the above Formulas (1) to (6), a conversion formula for converting a point IDA of the camera coordinate system acquired by the point group acquisition unit 112 into a point $p_B$ of the user coordinate system is expressible as in the following Formula (7).

[Math. 7]

$$p_B = Mt \cdot (p_A - A0) + B0 \quad (7)$$

Similarly, a conversion formula for converting a point $v_A$ of the position vector of the camera coordinate system into a point $v_B$ of the position vector of the user coordinate system is expressible as in the following Formula (8).

[Math. 8]

$$v_B = Mt \cdot v_A \quad (8)$$

Similarly, a conversion formula for converting the point $p_B$ of the user coordinate system into the point $p_A$ of the camera coordinate system is expressible as in the following Formula (9).

[Math. 9]

$$p_A = Mt^{-1} \cdot (p_B - B0) + A0 \quad (9)$$

Similarly, a conversion formula for converting the point $v_B$ of the position vector of the user coordinate system into the point $v_A$ of the position vector of the camera coordinate system is expressible as in the following Formula (10).

[Math. 10]

$$v_A = Mt^{-1} \cdot v_B \quad (10)$$

By the above conversion Formulas (7) to (10), it is possible to make the camera coordinate system and the user coordinate system correspond to each other.

The point group synthesis unit 116 shown in FIG. 3 synthesizes point group data on a user coordinate system converted for each of images together by the coordinate conversion unit 115. When the point group data corresponding to the respective images is synthesized together, the point group data of a portion common between the respective images is also added. Therefore, the density of the point group data of the portion common between the respective images increases.

Here, since the point group data contains a relatively large error, the point group data originally placed at the same position is likely to be deviated at a portion at which the point group data overlaps each other. Accordingly, at the portion at which the point group data overlap each other, the synthesized point group data may be filtered to perform adjustment so that influence by the deviation reduces. On the other hand, when there is a lack or the like in a point group, the lack or the like may be complemented using a surrounding point group.

Figure 6:
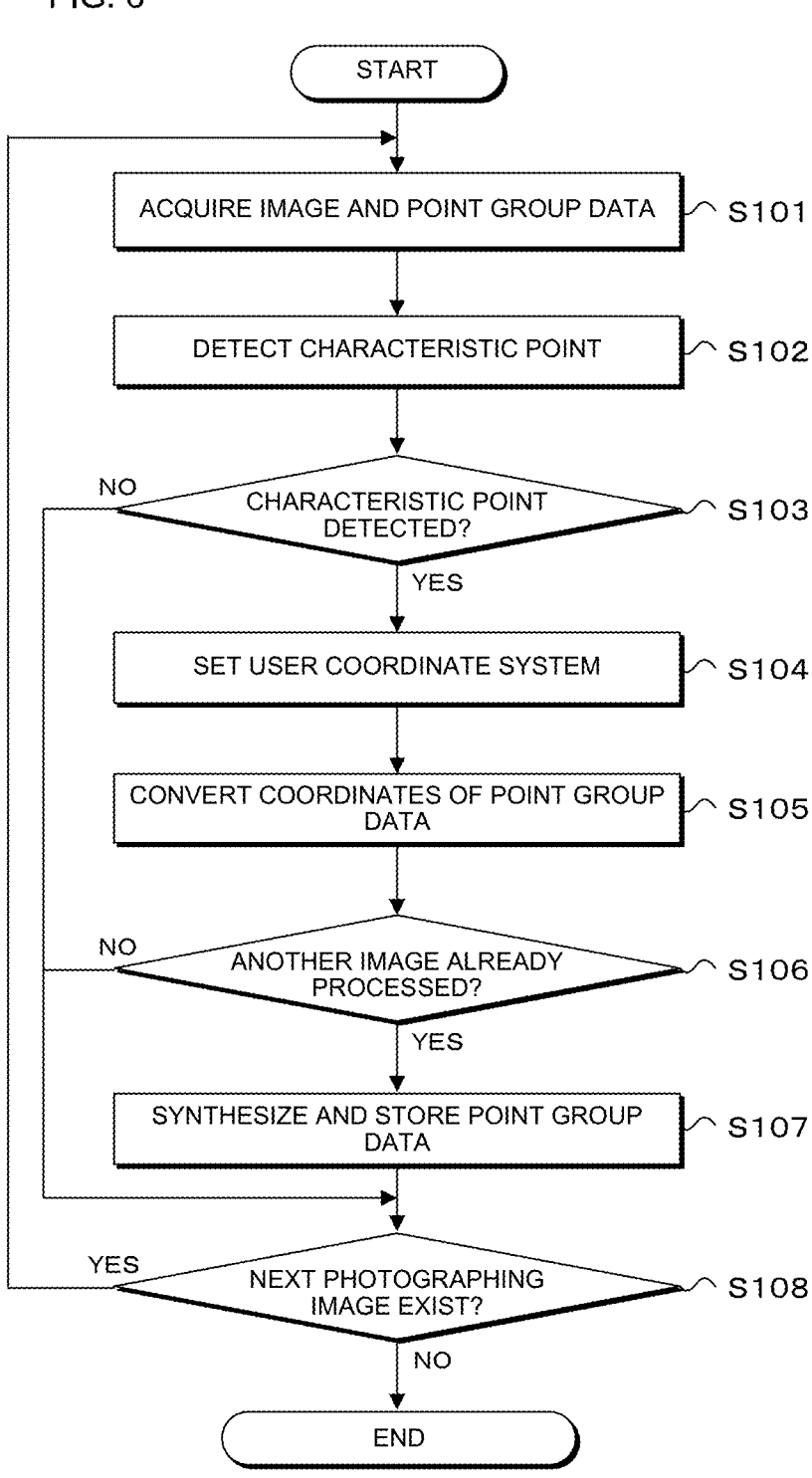
FIG. 6 is a flowchart for describing the operation of the photographing apparatus in which the point group data synthesis program according to the embodiment is installed.

An example of the operation of the photographing apparatus 1 according to the embodiment will be described with reference to FIG. 6. The operation is repeatedly performed every time the photographing apparatus 1 photographs a welding target.

First, the photographing unit 14 of the photographing apparatus 1 acquires an image obtained by photographing a subject including a welding target, while the coordinate acquisition unit 15 of the photographing apparatus 1 acquires point group data corresponding to the subject photographed by the photographing unit 14 (step S101).

Subsequently, the detection unit 113 of the photographing apparatus 1 detects the characteristic point of a reference marker from the image acquired in step S101 (step S102) and acquires a position on the camera coordinate system of the characteristic point.

When the detection of the characteristic point is not allowed in step S102 (NO in step S103), the processing proceeds to step S108 that will be described later. On the other hand, when the detection of the characteristic point is allowed in step S102 (YES in step S103), the user coordinate system setting unit 114 of the photographing apparatus 1 sets a user coordinate system with reference to the characteristic point detected in step S102 (step S104).

Subsequently, the coordinate conversion unit 115 of the photographing apparatus 1 converts point group data on the camera coordinate system into point group data on the user coordinate system (step S105).

Subsequently, when another image has not been processed (NO in step S106), the processing proceeds to step S108. On the other hand, when the other image has been processed (YES in step S106), the point group synthesis unit 116 of the photographing apparatus 1 synthesizes the point group data converted into the user coordinate system in processing for the other image with the point group data converted into the user coordinate system in step S105 and stores the resulting point group data in the storage unit 12 (step S107).

Subsequently, when a next photographing image exists (YES in step S108), the control unit 11 of the photographing apparatus 1 proceeds to the processing of step S101. On the other hand, when the next photographing image does not exist (NO in step S108), the control unit 11 of the photographing apparatus 1 ends the operation.

As described above, the photographing apparatus 1 according to the embodiment is allowed to: acquire a plurality of images including a welding target; acquire point group data on a camera coordinate system for each of the images; detect respective positions on the camera coordinate system of a visual characteristic point commonly included in the respective images; set a user coordinate system with reference to the detected position on the camera coordinate system of the characteristic point; convert the point group data on the camera coordinate system into point group data on the user coordinate system for each of the images, and synthesize the converted point group data on the user coordinate system together.

Thus, it is possible to synthesize point group data on a camera coordinate system together after converting the same into point group data on a user coordinate system with reference to a characteristic point commonly included in a plurality of images having higher resolution than that of the point group data. That is, by setting a user coordinate system with reference to a common characteristic point detected on a plurality of images having high resolution, it is possible to set an accurate coordinate system accurately reflecting the position of an actual characteristic point compared with a case in which the user coordinate system is set with reference to a characteristic point detected on point group data having low resolution. Further, by synthesizing point group data on an accurate user coordinate system together, it is possible to increase the accuracy of the synthesized point group data.

Therefore, the photographing apparatus 1 according to the embodiment is allowed to increase accuracy in synthesizing plurality of point group data together.

Note that the present invention is not limited to the embodiment described above but may be carried out in various other forms without departing from its gist. Therefore, the above embodiment is given only for illustration in all respects and should not be interpreted in a limited way.

For example, the embodiment described above uses a welding robot. However, the present invention is applicable to, for example, an industrial robot including a handling robot that performs picking or the like. In this case, a welding robot system and a welding target used in the above embodiment may be replaced with an industrial robot system and a working target, respectively.

Further, the embodiment described above illustrates a mode in which the photographing apparatus 1 includes the image sensor (photographing unit 14), the distance measurement sensor (coordinate acquisition unit 15), and the respective constituting elements shown in FIG. 3. However, for example, the respective constituting elements may be divided into a plurality of apparatuses to realize a point group data synthesis system including the plurality of apparatuses. Illustratively, the respective constituting elements of the photographing apparatus 1 shown in FIG. 3 may be provided in a server apparatus, and the server apparatus may acquire images and point group data from the image sensor and the distance measurement sensor via a network and transmit point group data synthesized together on the basis of the acquired images and the point group data to the photographing apparatus 1 via the network.

Further, the program in the embodiment described above is capable of being installed or loaded into a computer by being downloaded via various recording media (non-transitory computer-readable media) such as an optical disk like a CD-ROM, a magnetic disk, and a semiconductor memory or via a communication network or the like.

What is claimed is:

1. A point group data synthesis apparatus comprising:
an image acquisition unit that acquires a plurality of images including a working target;
a point group acquisition unit that acquires, for each of the images, point group data on a camera coordinate system with reference to a camera that photographs the images;
a detection unit that detects each position on the camera coordinate system of a visual characteristic point commonly included in the respective images;

a user coordinate system setting unit that sets a user coordinate system with reference to the position on the camera coordinate system of the visual characteristic point detected for each of the images by the detection unit;

a coordinate conversion unit that converts, for each of the images, the point group data on the camera coordinate system into point group data on the user coordinate system; and a point group synthesis unit that synthesizes the point group data on the user coordinate system converted for each of the images by the coordinate conversion unit together, wherein in response to not detecting the visual characteristic point in each of the images, the detection unit causes a point on the image to be specified to detect the visual characteristic point, and sets the detected position of the specified point as the position of the visual characteristic point on the image and on the point group data.

2. The point group data synthesis apparatus according to claim 1, wherein, in response to detecting the visual characteristic point of the marker on a basis of each of the images, the detection unit sets the detected positions of the visual characteristic point as the position of the visual characteristic point on the image and the point group data.

3. A non-transitory computer-readable medium having recorded thereon a point group data synthesis program causing a computer to function as:

an image acquisition unit that acquires a plurality of images including a working target;

a point group acquisition unit that acquires, for each of the images, point group data on a camera coordinate system with reference to a camera that photographs the images;

a detection unit that detects each position on the camera coordinate system of a visual characteristic point commonly included in the respective images;

a user coordinate system setting unit that sets a user coordinate system with reference to the position on the camera coordinate system of the visual characteristic point detected for each of the images by the detection unit;

a coordinate conversion unit that converts, for each of the images, the point group data on the camera coordinate system into point group data on the user coordinate system; and a point group synthesis unit that synthesizes the point group data on the user coordinate system converted for each of the images by the coordinate conversion unit together, wherein in response to not detecting the visual characteristic point in each of the images, the detection unit causes a point on the image to be specified to detect the visual characteristic point, and sets the detected position of the specified point as the position of the visual characteristic point on the image and on the point group data.

4. A point group data synthesis method performed by a processor, the method comprising the steps of:

acquiring a plurality of images including a working target;

acquiring, for each of the images, point group data on a camera coordinate system with reference to a camera that photographs the images;

detecting each position on the camera coordinate system of a visual characteristic point commonly included in the respective images;

determining that the visual characteristic point is not included in each of the images;

causing a point on the image to be specified to detect the visual characteristic point;

setting the detected position of the specified point as the position of the visual characteristic point on the image and on the point group data;

setting a user coordinate system with reference to the position on the camera coordinate system of the visual characteristic point detected for each of the images;

converting, for each of the images, the point group data on the camera coordinate system into point group data on the user coordinate system; and synthesizing the point group data on the user coordinate system converted for each of the images together.

5. A point group data synthesis system comprising:

a photographing apparatus that includes an image sensor that photographs a plurality of images including a working target and a distance measurement sensor that measures a distance to the working target;

an image acquisition unit that acquires the images from the image sensor;

a point group acquisition unit that acquires, for each of the images, point group data on a camera coordinate system with reference to the photographing apparatus from the distance measurement sensor;

a detection unit that detects each position on the camera coordinate system of a visual characteristic point commonly included in the respective images;

a user coordinate system setting unit that sets a user coordinate system with reference to the position on the camera coordinate system of the characteristic point detected for each of the images by the detection unit;

a coordinate conversion unit that converts, for each of the images, the point group data on the camera coordinate system into point group data on the user coordinate system; and a point group synthesis unit that synthesizes the point group data on the user coordinate system converted for each of the images by the coordinate conversion unit together, wherein in response to not detecting the visual characteristic point in each of the images, the detection unit causes a point on the image to be specified to detect the visual characteristic point, and sets the detected position of the specified point as the position of the visual characteristic point on the image and on the point group data.

* * * * *